(12) United States Patent  (10) Patent No.: US 9,125,011 B1
Jintaseranee et al.  (45) Date of Patent: Sep. 1, 2015

(54) WIRELESS EGRESS CONTROL OF USER DATA SETS BASED ON GEO-CONTROL TAGS IN THE USER DATA SETS

(75) Inventors: Kosol Jintaseranee, San Jose, CA (US); Sara Gatmir-Motahari, Millbrae, CA (US); Mark J. Bonn, Granite Bay, CA (US); Michael Patrick Finegan, Orinda, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 204 days.

(21) Appl. No.: 13/487,327

(22) Filed: Jun. 4, 2012

(51) Int. Cl.
*H04W 24/00* (2009.01)
*H04W 4/02* (2009.01)
*H04W 64/00* (2009.01)
*H04L 29/08* (2006.01)

(52) U.S. Cl.
CPC ........... *H04W 4/02* (2013.01); *H04L 29/08936* (2013.01); *H04W 64/00* (2013.01)

(58) Field of Classification Search
CPC ...... H04W 64/00; H04W 4/02; G01S 5/0252; H04L 29/08936; H04L 29/08657; H04L 29/08108
USPC .......................... 455/456.3, 456.1, 457, 414.2
See application file for complete search history.

(56) References Cited

U.S. PATENT DOCUMENTS

| 7,558,852 | B2* | 7/2009 | Douglas et al. ............... 709/224 |
| 2006/0238380 | A1 | 10/2006 | Kimchi et al. |
| 2009/0088183 | A1* | 4/2009 | Piersol et al. ............. 455/456.1 |
| 2009/0156179 | A1* | 6/2009 | Hahn et al. ................. 455/414.1 |
| 2010/0069035 | A1 | 3/2010 | Johnson |
| 2012/0162013 | A1* | 6/2012 | Piersol et al. ................. 342/386 |

* cited by examiner

*Primary Examiner* — Khalid Shaheed (57) ABSTRACT

In a wireless communication network, wireless communication devices receive user instructions indicating geographic control of associated user data sets. The wireless communication devices translate the user instructions into geo-control tags for the associated user data sets and include the geo-control tags in the associated user data sets. The wireless communication devices exchange wireless signals transporting the user data sets and their geo-control tags with wireless access points. The wireless access points individually control wireless egress of the user data sets based on their geo-control tags.

18 Claims, 7 Drawing Sheets

WIRELESS EGRESS CONTROL OF USER DATA SETS BASED ON GEO-CONTROL TAGS IN THE USER DATA SETS

TECHNICAL BACKGROUND

Wireless communication devices wirelessly exchange data sets with wireless networks. For example, smartphones and tablet computers exchange videos and photographs over wireless networks. Unfortunately, the ability of the users to control the wireless egress of their data sets is neither robust nor efficient.

Deep packet inspection systems are used to scan data traffic. Deep packet inspection systems typically detect the viruses, applications, and other data transported within streams of packet traffic. Deep packet inspection systems are not effectively being used to provide wireless device users with geographic control of their data sets.

Various media files and documents have embedded watermarks. The watermarks are digitally integrated into the files so they are easy to see (usually) but hard to remove. The watermarks may carry messages, labels, warnings, or some other information. Watermarks are not being effectively used to provide wireless device users with geographic control of their data sets.

TECHNICAL OVERVIEW

In a wireless communication network, wireless communication devices receive user instructions indicating geographic control of associated user data sets. The wireless communication devices translate the user instructions into geo-control tags for the associated user data sets and include the geo-control tags in the associated user data sets. The wireless communication devices exchange wireless signals transporting the user data sets and their geo-control tags with wireless access points. The wireless access points individually control wireless egress of the user data sets based on their geo-control tags.

DETAILED DESCRIPTION

Figure 1:
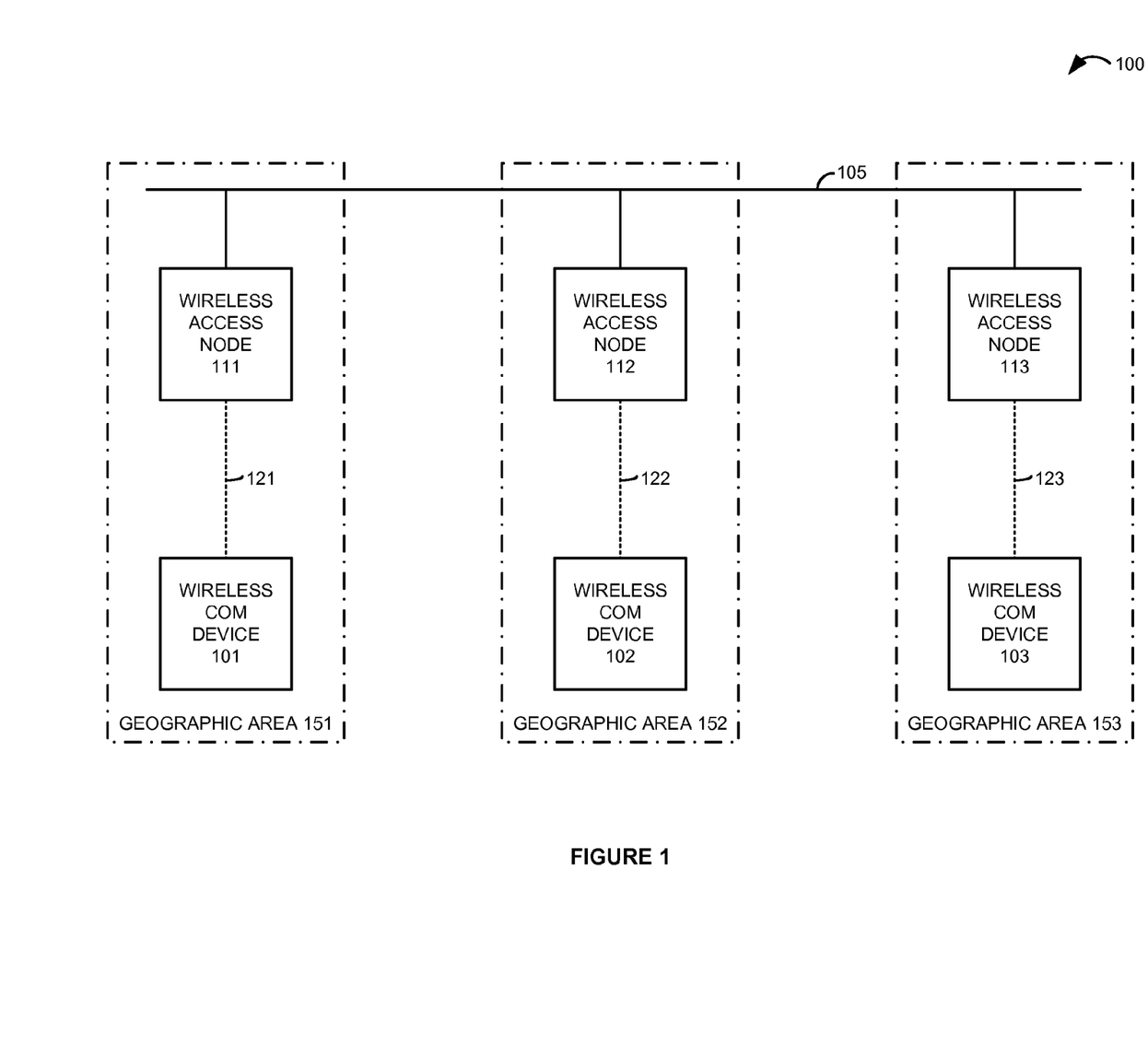
FIG. 1 illustrates a wireless communication network to control the wireless egress of user data sets based on geo-control tags.

FIG. 1 illustrates wireless communication network 100 to control the wireless egress of user data sets based on integrated geo-control tags. Wireless communication network 100 comprises wireless communication devices 101-103, data network 105, and wireless access nodes 111-113. Wireless communication devices 101-113 and wireless access nodes 111-113 exchange data over respective wireless communication links 121-123.

Wireless communication devices 101-103 comprise smartphones, tablet computers, media players, cameras, wireless transceivers, wireless modems, and the like. Wireless access nodes 111-113 comprise base stations, hot-spots, repeaters, or some other wireless communication transceiver systems. Data network 105 comprises communication links, gateways, servers, routers, and/or some other data communication equipment. Wireless communication links 121-123 utilize wireless communication protocols such as Wireless Fidelity (WiFi), Long Term Evolution (LTE), Global System for Mobile Communications (GSM), Evolution Data Only (EVDO), Bluetooth, or some other wireless format—including combinations thereof. These wireless protocols typically transport additional communication protocols, such as Internet Protocol (IP) and the like.

Wireless communication devices 101-103 and wireless access nodes 111-113 are located in respective geographic areas 151-153. Geographic areas 151-153 are selected by the user. Geographic areas 151-153 may be large or small and they may be two-dimensional or three dimensional. The geographic scope and resolution of geographic areas 151-153 correspond to the wireless coverage components (sectors, hotspots, and the like) that make-up wireless communication network 100.

In operation, wireless communication devices 101-103 receive user instructions for the geographic control of selected user data sets. The user data sets comprise pictures, video, audio, documents, databases, software, or some other type of digital information. The user instructions indicate how egress of the data sets should be handled in user-identified geographic areas 151-153. For example, the user of wireless communication device 102 might provide an instruction to block a picture from egress beyond geographic areas 152-153. Wireless communication devices 101-103 translate the user instructions into geo-control tags and then integrate the geo-control tags into the associated user data sets. In some examples, the geo-control tags comprise encoded watermarks that are integrated within media, such as pictures, video, and graphics data.

Wireless communication devices 101-103 transfer their user data sets with their geo-control tags over wireless links 121-123 to wireless access points 111-113 for subsequent delivery. Wireless access nodes 111-113 detect the geo-control tags in the user data sets and implement the egress control as indicated by the geo-control tags. To detect the geo-control code, wireless access nodes 111-113 may use deep packet inspection systems or some other data scanning system. Wireless access nodes 111-113 may exchange the user data sets with one another over data network 105 if the transfers are allowed by the geo-control tags. Wireless access nodes 111-113 may egress the user data sets to their target wireless communication devices 101-103 if the wireless egress is allowed by the geo-control tags. In some examples, wireless access points 111-113 copy or report the egress of user data sets into specific geographic areas based on their geo-control tags.

In the exemplary instruction to block the picture from egress beyond geographic areas 152-153, the user of wireless communication device 102 (or the user of another device) may attempt to send the picture to wireless communication devices 101 and 103. Wireless access node 113 would transfer the picture to wireless communication device 103 as allowed by the geo-control tag, while wireless access node 111 would block wireless egress of the picture to wireless communication device 151 as directed by the geo-control tag. Note that wireless access node 112 or a corresponding network gateway might also block the picture in accord with the geo-control tags before it reaches wireless access node 111.

Consider another example where the user of wireless communication device 102 provides an instruction to report a video file that egresses into geographic area 151 or into geographic area 153. Wireless communication device 102 would then embed the corresponding geo-control tag in the video data set. Subsequently, the user of wireless communication device 102 (or the user of another device) transfers the video file to wireless communication devices 101 and 103. Wireless access node 112 would transfer the video file to wireless access nodes 111 and 113. Wireless access node 113 would transfer the video file to wireless communication device 103 and transfer a data report of the video file egress into geographic area 153 to wireless communication device 102 as directed by the geo-control tag. Likewise, wireless access node 111 would transfer the video file to wireless communication device 101 and transfer a data report of the video file egress into geographic area 151 to wireless communication device 102 as directed by the geo-control tag.

The geo-control tags comprise control data that is embedded into the host data sets in a detectable-manner that is hard for unscrupulous users to remove—like a watermark. The geo-control tag data indicates user egress instructions for their host data sets, such as block, report, copy, and the like. The geo-control tags also include codes that indicate the geographic areas that apply to these user instructions. In some examples, the geographic areas are specified by a set of latitude/longitude/altitude points that define a two- or three dimensional area. Knowing their own locations, access points and gateways calculate if they are in a geographic area that is invoked by an egress instruction. In other examples, the geographic areas are specified by a list of wireless access nodes and gateways that were geographically selected by coverage area to define a two- or three dimensional area. Various other techniques, such as geo-fence IDs and database translation, could be used by access nodes and gateways to resolve their own locations relative to the geographic boundaries in the geo-control tags.

Wireless communication devices 101-103 may be configured to display geographic maps and receive user instructions indicating geographic areas responsive to the display of the geographic maps. The resolution of the maps typically corresponds to the resolution of the wireless coverage components (sectors, hotspots, and the like) that make-up the wireless communication network. Wireless communication devices 101-103 may also be configured to display geographic control options and receive the user instructions to block or report egress responsive to the display of the control options.

In some examples, network gateways are similarly configured like access nodes 111-113 to block, copy, and report network egress of the user data sets based on their geo-control tags as described above for wireless access nodes 111-113. The network gateways would be assigned geographic locations network coverage areas in a similar manner to the wireless coverage areas of the access nodes.

Figure 2:
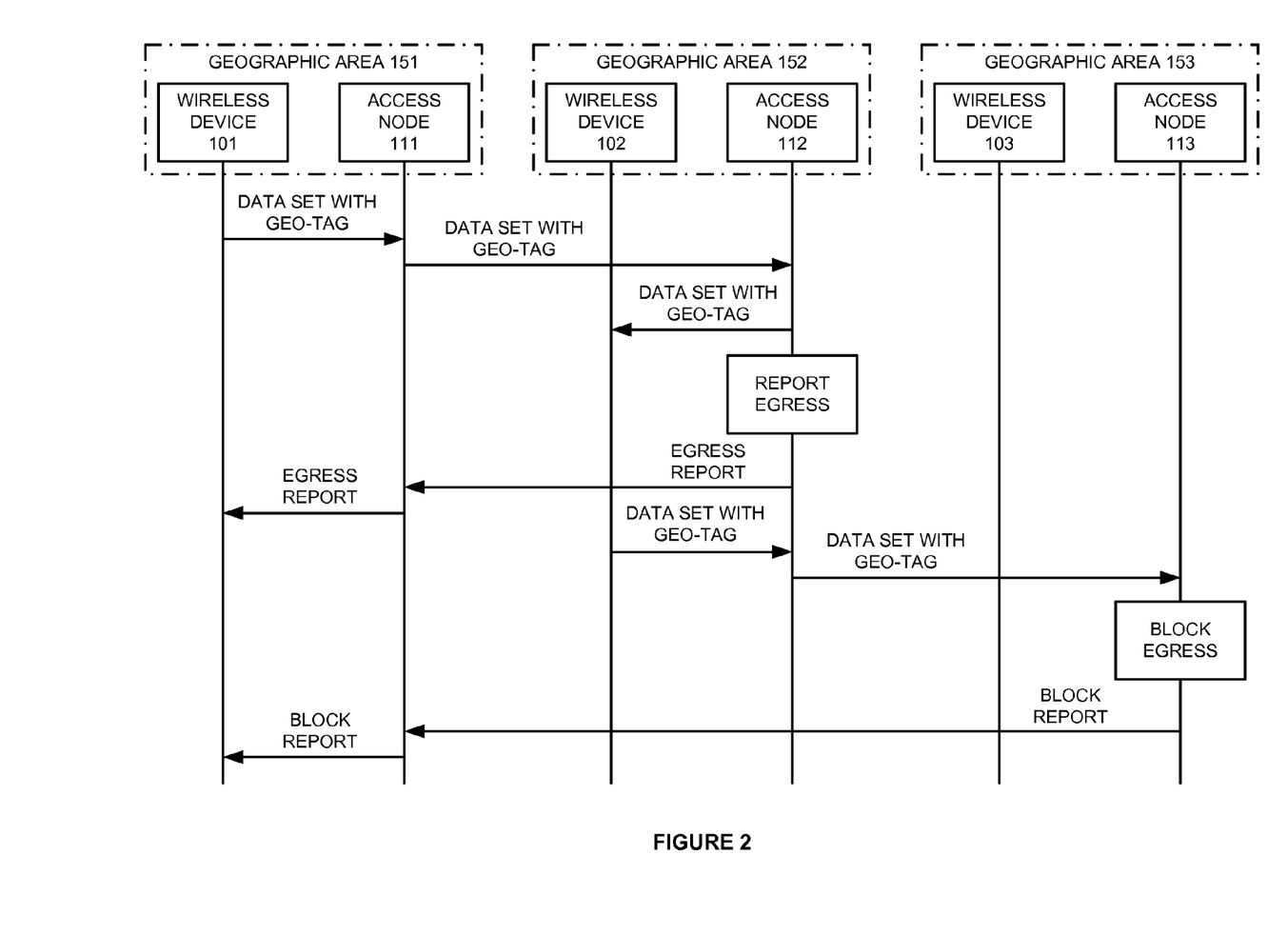
FIG. 2 illustrates the operation of the wireless communication network to control the wireless egress of user data sets based on geo-control tags.

FIG. 2 illustrates the operation of wireless communication network 100 to control the wireless egress of user data sets based on geo-control tags. Wireless communication device 101 transfers a data set with a geo-control tag to wireless access node 111 for delivery to wireless communication device 102. The geo-control tag indicates an instruction to report any egress of the data set into geographic area 152 to wireless communication device 101. The geo-control tag also indicates an instruction to block and report (to device 101) attempted egress of the data set into geographic area 153.

Wireless access node 111 then transfers the data set with the geo-control tag to wireless access node 112 which is currently serving wireless communication device 102 in geographic area 152. Wireless access node 112 transfers the data set with the geo-control tag to wireless communication device 102 in geographic area 152. In response to the geo-control tag, wireless access node 112 transfers an egress report back to wireless communication device 101 through wireless access node 111. For example, wireless access node 112 might report the egress by data set, time, and location in a text message to wireless communication device 101.

Subsequently, wireless communication device 102 transfers the data set with the geo-control tag to wireless access node 112 for delivery to wireless communication device 103. The geo-control tag still indicates the instruction to block and report attempted egress into geographic area 153. Wireless access node 112 transfers the data set with the geo-control tag to wireless access node 113 which is currently serving wireless communication device 103 in geographic area 153. In response to the geo-control tag, wireless access node 113 does not transfer the data set to wireless communication device 103 in geographic area 153.

Further in response to the geo-control tag, wireless access node 113 transfers an egress report back to wireless communication device 101 through wireless access node 111. Wireless access node 113 may determine that is within geographic area 153 by comparing its location to a set of geographic coordinates from the geo-control tag that bound geographic area 153. Alternatively, the geo-control tag may include a list of nodes in area 153—including wireless access node 113.

Figure 3:
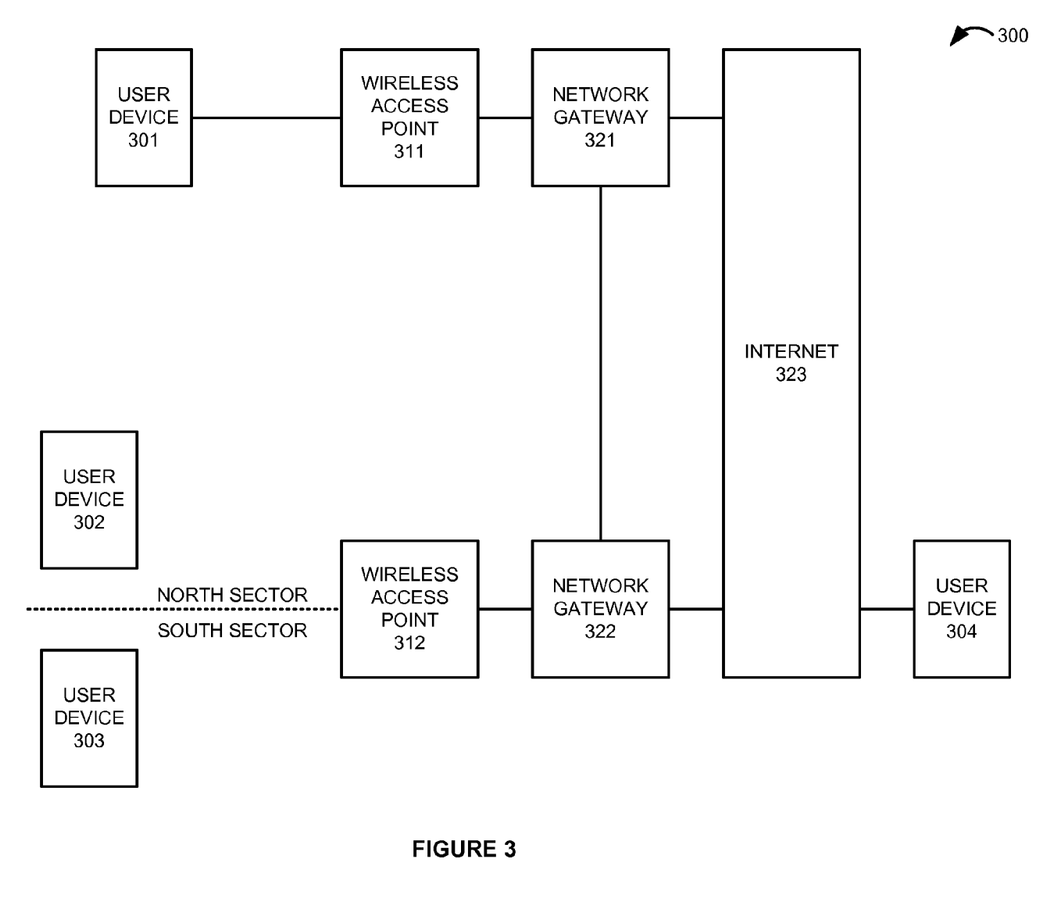
FIG. 3 illustrates a wireless communication network to control the wireless egress of user data sets based on geo-control tags.

FIG. 3 illustrates the operation of wireless communication network 300 to control the wireless egress of user data sets based on geo-control tags. Wireless communication network 300 comprises user devices 301-304, wireless access points 311-312, and network gateways 321-322. Wireless communication network 300 is an example of wireless communication network 100 described above, although network 100 may implement alternative configurations and operations. User devices 301-304 comprise phones, mobile computers, cameras, wireless modems, and the like. User devices 301-304 and wireless base stations 311-312 exchange wireless communications using protocols such as WiFi, LTE, GSM, EVDO, Bluetooth, or some other wireless format—including combinations thereof.

In operation, user device 301 records a video and adds a geo-control tag responsive to user instructions. The user instructions allow wireless egress into the north sector of wireless access point 312 but block wireless egress into the south sector of wireless access point 312. The user instructions do not allow network egress into Internet 323. User device 301 then attempts to send the video and geo-control tag to user devices 302-304 responsive to user instructions. Based on the geo-control tag, wireless access point 311 transfers the video to wireless access point 312 for delivery to user devices 302-303 and to network gateway 321 for delivery to user device 304 over Internet 323. Based on the geo-control tag, wireless access point 312 wirelessly transfers the video to user device 302 in the north sector, but wireless access point 312 does not wirelessly transfer the video to user device 303 in the south sector. Based on the geo-control tag, network gateway 321 blocks the video intended for user device 304 from egress to Internet 323. Note that the actions that are triggered by the geo-control tags may be applied at intermediate points prior to the egress points. Based on the geo-control tags, network gateway 321 or 322 might block the video intended for wireless device 303, and wireless access point 311 might block the video intended for wireless device 304.

In another operation, user device 301 takes a picture and adds a geo-control tag responsive to user instructions. The user instructions are to report egress into Internet 323 or the north sector of wireless access point 312, but to block and report wireless egress into the south sector of wireless access point 312. User device 301 then attempts to send the video and geo-control tag to user devices 302-304 responsive to the user instructions. Based on the geo-control tag, wireless access point 311 transfers the picture to wireless access point 312 for delivery to user devices 302-303 and to network gateway 321 for delivery to user device 304 over Internet 323. Based on the geo-control tag, wireless access point 312 wirelessly transfers the video to user device 302 in the north sector and transfers an egress report back to user device 301. Wireless access point 312 also blocks and reports the attempted wireless transfer of the picture to user device 303 in the south sector back to user device 301. Based on the geo-control tag, network gateway 321 transfers the picture over Internet 323 to user device 304 and reports the egress back to user device 301. Network gateway 321 may provide its own location (probably not precisely) in the egress report.

Figure 4:
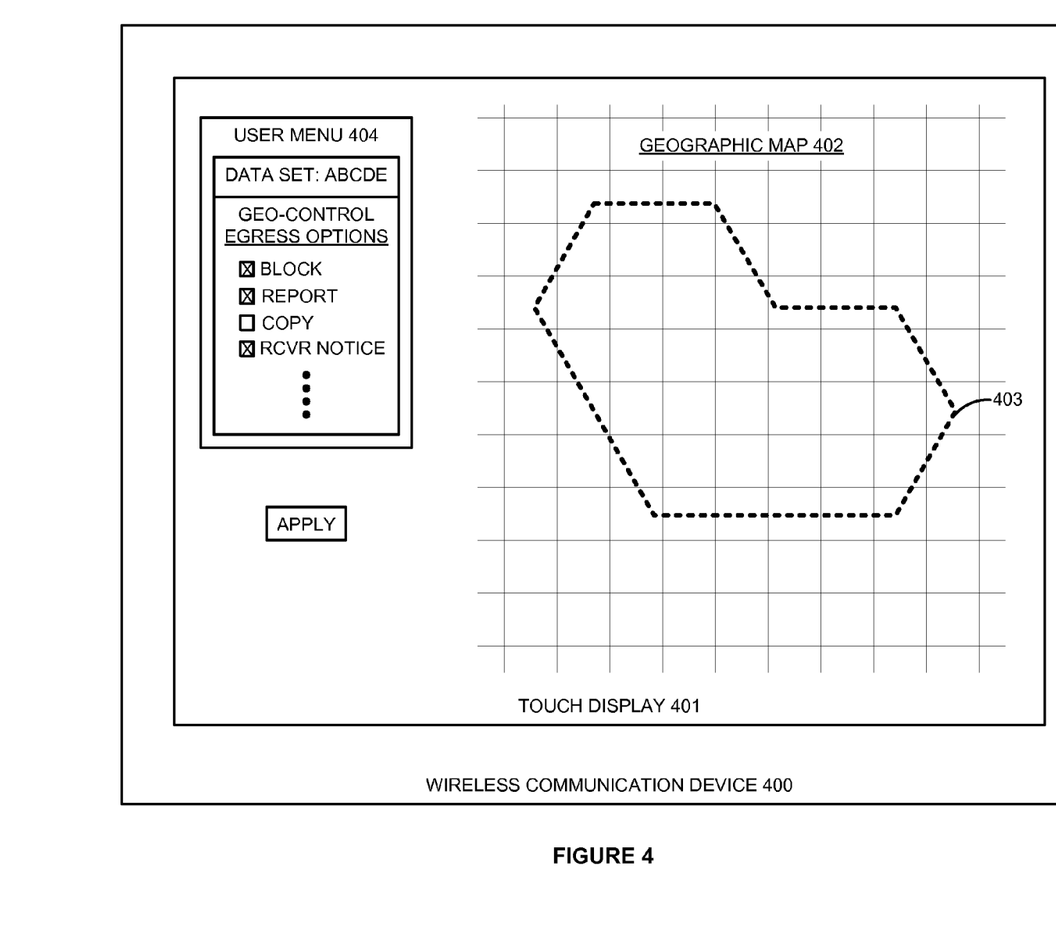
FIG. 4 illustrates a wireless communication device to control the wireless egress of user data sets based on geo-control tags.

FIG. 4 illustrates wireless communication device 400 to control the wireless egress of user data sets based on geo-control tags. Wireless communication network 400 is an example of user devices 101-103 and 301-304, although these devices may implement alternative configurations and operations. Wireless communication device 400 includes touch display 401. Note that representation of touch display 401 is highly simplified for clarity to focus on inventive principles.

Touch display 401 illustrates geographic map 402 that is represented here by a simple grid. On geographic map 402, the user has indicated geographic area 402 with their finger or stylus. Map 402 would typically include additional controls for navigation, zoom, layer exposure, altitude input, and the like. Wireless communication device 400 is configured to correlate user map inputs with wireless coverage sector boundaries within one or more wireless networks. Thus, touch display 401 would snap the user map inputs to the sector or coverage boundaries of various wireless access points.

Touch display 401 also illustrates user geographic control menu 404. Geographic control menu 404 identifies the data set (ABCDE) and may also include additional data for the data set including images and other metadata. Geographic control menu 404 also lists various check-box options such as block, report, copy, and receiver notice, although there could be others. Thus, touch display 401 shows a user instruction to block and report the attempted wireless egress of data set ABCDE into geographic area 403. The user instruction also requests that notice be sent to the receiver, such as a text message to the intended recipient indicating that a data set intended for them has been blocked.

When the user touches the "APPLY" button on touch display 401, wireless communication device 400 translates the user instruction into a geo-control tag. The geo-control tag may be a list of sectors, geographic boundary points, geofence ID, or some other information that correlates to geographic area 403. The geo-control tag also indicates the block and reporting instructions.

In the various examples described above, public networks such as the Internet may be treated as having a global location area. Alternatively, these public networks may have their own non-geographic treatment. For example, egress control to the public Internet could use control tags that are not geographic based.

In the various examples described above, the technique could be selectively applied to a set of user devices. Thus, only communications from and/or to the set of devices would be analyzed to detect and implement the geo-control tags. Typically, the application of this technique to the set of devices would be triggered when the individual devices in the set register for wireless service.

Figure 5:
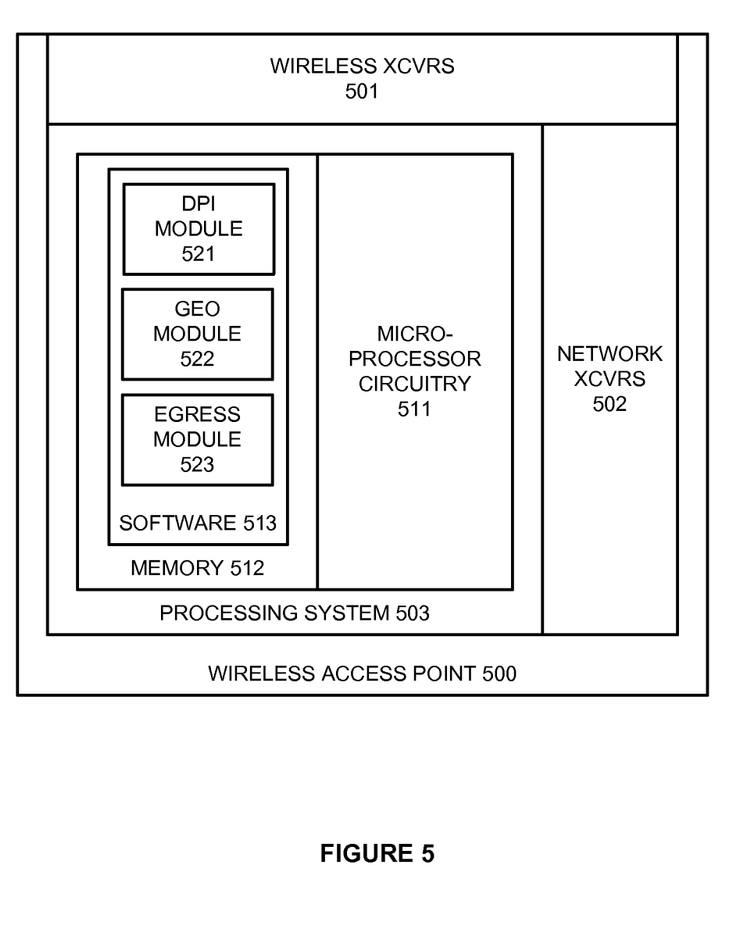
FIG. 5 illustrates a wireless access point to control the wireless egress of user data sets based on geo-control tags.

FIG. 5 illustrates wireless access point 500 to control the wireless egress of user data sets based on geo-control tags. Wireless access point 500 is an example of the access points described herein, although these wireless systems may use alternative configurations and operations. Wireless access point 500 comprises communication transceivers 501, network transceivers 502, and processing system 503. Processing system 503 comprises micro-processing circuitry 511 and memory 512. Memory 512 stores software 513. Wireless access point 500 may be integrated onto a single platform or may be distributed across multiple diverse computer and communication systems. Some conventional aspects of wireless access point 500 are omitted for clarity, such as power supplies, enclosures, and the like.

Wireless transceivers 501 comprise communication components, such as circuitry, memory, software, antennas, amplifiers, filters, modulators, signal processors, and the like. In some examples, transceivers 501 include multiple transceiver sub-systems overlaid wide-area wireless networks. Wireless transceivers 501 wirelessly exchange data sets having geo-control tags with wireless user devices using protocols such as WiFi, LTE, GSM, EVDO, Bluetooth, or some other wireless format—including combinations thereof. Note that other networking protocols, such as Ethernet or Internet, may be transported by the wireless protocols.

Network transceivers 502 comprise communication components, such as ports, circuitry, memory, software, and the like. Network transceivers 502 typically utilize Ethernet, Internet, or some other networking protocol—including combinations thereof. Network transceivers 502 exchange data sets having geo-control tags with other network elements and networks.

Micro-processor circuitry 511 comprises circuit boards that hold integrated circuit chips and associated electronics. Memory 512 comprises non-transitory data storage media, such as flash drives, disc drives, and the like. Software 513 comprises computer-readable instructions that control the operation of micro-processor circuitry 511 when executed. Software 513 includes modules 521-523 and may also include operating systems, applications, utilities, databases, and the like. Micro-processor circuitry 511 and memory 512 may be integrated into a single network element or may be distributed across multiple network elements.

When executed by circuitry 511, DPI module 521 directs circuitry 511 to scan user data sets to detect geo-control tags. When executed by circuitry 511, geo module 522 directs circuitry 511 to determine if the location of access point 500 is invoked by any geo-control tags that are detected by DPI module 521. When executed by circuitry 511, egress module 523 directs circuitry 511 to implement the instructions from the detected geo-control tags that also invoke access point 500 by location.

Figure 6:
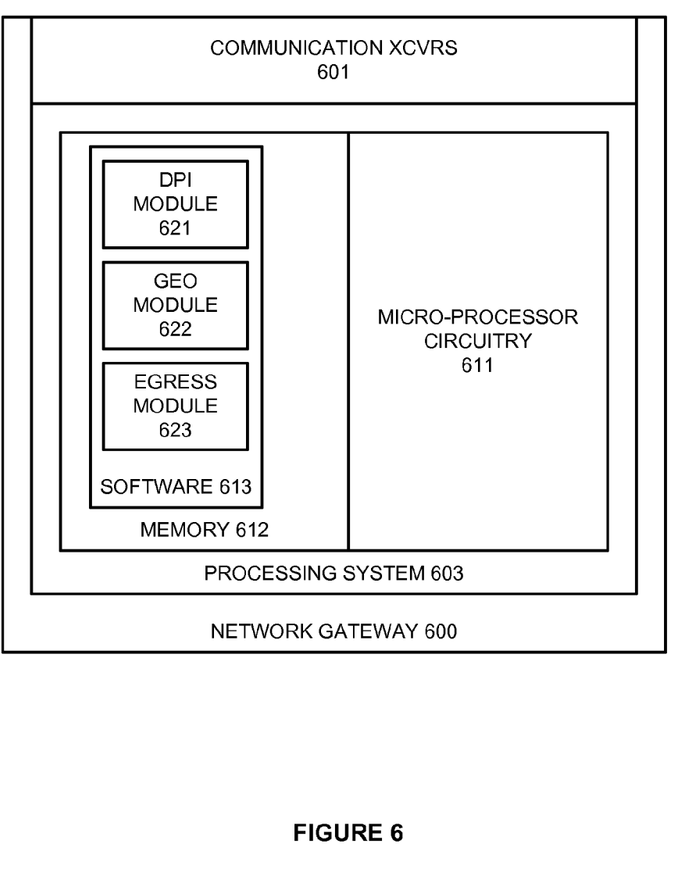
FIG. 6 illustrates a network gateway to control the wireless egress of user data sets based on geo-control tags.

FIG. 6 illustrates network gateway 600 to control the wireless egress of user data sets based on geo-control tags. Network gateway 600 is an example of the network elements and gateways described herein, although these network systems may use alternative configurations and operations. Network gateway 600 comprises communication transceivers 601 and processing system 603. Processing system 603 comprises micro-processing circuitry 611 and memory 612. Memory 612 stores software 613. Network gateway 600 may be integrated into a single platform or may be distributed across multiple diverse computer and communication systems. Some conventional aspects of network gateway 600 are omitted for clarity, such as power supplies, enclosures, and the like.

Communication transceivers 601 comprise communication components, such as ports, circuitry, memory, software, and the like. Communication transceivers 601 typically utilize Ethernet, Internet, or some other networking protocol—including combinations thereof. Network transceivers 602 exchange data sets having geo-control tags with other network elements and networks.

Micro-processor circuitry 611 comprises circuit boards that hold integrated circuitry and associated electronics. Memory 612 comprises non-transitory, computer-readable, data storage media, such as flash drives, disc drives, and the like. Software 613 comprises computer-readable instructions that control the operation of micro-processor circuitry 611 when executed. Software 613 includes modules 621-623 and may also include operating systems, applications, utilities, databases, and the like. Micro-processor circuitry 611 and memory 612 may be integrated into a single network element or may be distributed across multiple network elements.

When executed by circuitry 611, DPI module 621 directs circuitry 611 to scan user data sets to detect geo-control tags. When executed by circuitry 611, geo module 622 directs circuitry 611 to determine if the location of network gateway 600 is invoked by any geo-control tags detected by DPI module 621. When executed by circuitry 611, egress module 623 directs circuitry 611 to implement the instructions from the detected geo-control tags that also invoke network gateway 600 by location.

Figure 7:
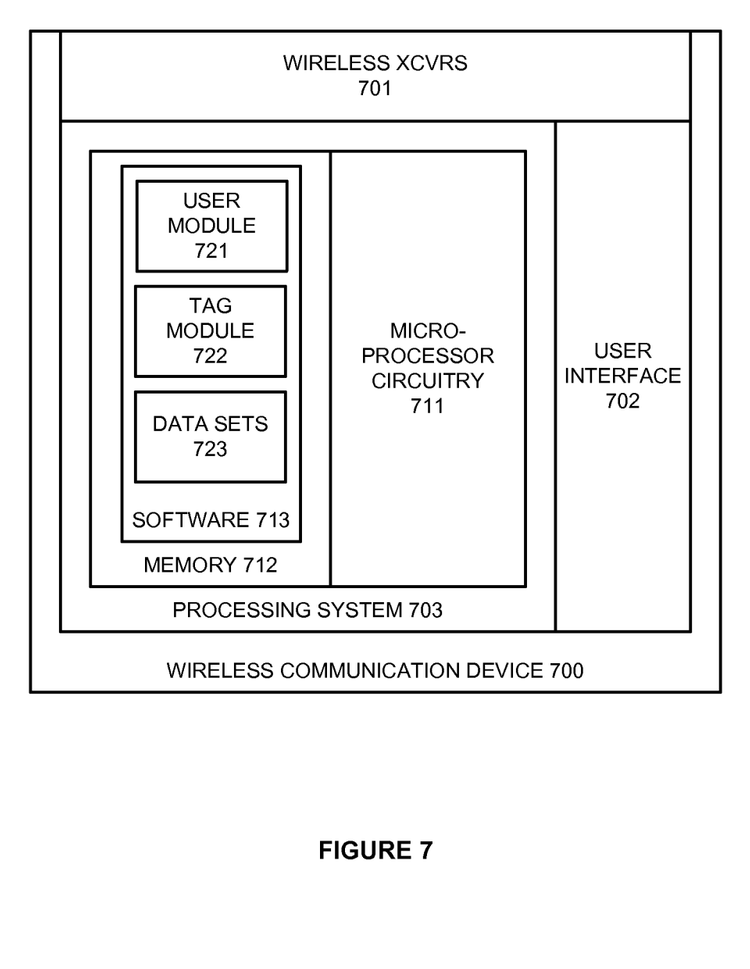
FIG. 7 illustrates a wireless communication device to control the wireless egress of user data sets based on geo-control tags.

FIG. 7 illustrates wireless communication device 700 to control the wireless egress of user data sets based on geo-control tags. Wireless communication device 700 is an example of the user devices described herein, although these user wireless communication devices may use alternative configurations and operations. Wireless communication device 700 comprises communication transceivers 701, user interface 702, and processing system 703. Processing system 703 comprises micro-processing circuitry 711 and memory 712. Memory 712 stores software 713. Some conventional aspects of wireless communication device 700 are omitted for clarity, such as power supplies, enclosures, and the like. Wireless communication device 700 may be integrated into other systems or devices. Some conventional aspects of wireless communication device 700 are omitted for clarity, such as power supplies, enclosures, and the like.

Wireless transceivers 701 comprise communication components, such as circuitry, memory, software, antennas, amplifiers, filters, modulators, signal processors, and the like. In some examples, the radio communications include multiple transceiver sub-systems for near-field, local network, and wide-area network data communications. Wireless transceivers 701 wirelessly exchange data sets having geo-control tags with wireless networks.

User interface 702 includes components to interact with a human operator, such as a touch display, speaker, microphone, camera, buttons, and switches. User interface 702 displays maps and menus and receives user instructions indicating geographic areas and egress instructions for data sets.

Micro-processor circuitry 711 comprises one or more circuit boards that hold integrated circuit chips and associated electronics. Memory 712 comprises non-transitory data storage media, such as flash drives, disc drives, and the like. Software 713 comprises computer-readable instructions that control the operation of micro-processor circuitry 711 when executed. Software 713 includes modules 721-722 and data sets 723 and may also include operating systems, applications, utilities, databases, and the like.

When executed by circuitry 711, user module 721 directs circuitry 711 to drive user interface 721 to present maps and menus to the user and to responsively receive user instructions indicating geographic areas and egress instructions for selected ones of user data sets 723. When executed by circuitry 711, tag module 722 directs circuitry 711 to translate the user instructions into geo-control tags and to integrate the geo-control tags into the selected ones of user data sets 723. Data sets 723 comprise photographs, videos, audio, data files, documents, and the like.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication network comprising:
   a plurality of wireless communication devices configured to display geographic control options, wherein the geographic control options comprise blocking or reporting a transmission of associated user data sets, and to receive user instructions for geographic control of the associated user data sets, translate the user instructions into geo-control tags for the associated user data sets, include the geo-control tags in the associated user data sets, and exchange wireless signals transporting the user data sets and their geo-control tags; and
   a plurality of wireless access points configured to exchange the wireless signals with the wireless communication devices that include the user data sets and their geo-control tags, and to individually control wireless egress of the user data sets from the wireless access points based on their geo-control tags.

2. The wireless communication network of claim 1 wherein the wireless access points are configured to individually control wireless egress by processing the geo-control tags to block associated ones of the data sets from wireless egress of the wireless communication network.

3. The wireless communication network of claim 1 wherein the wireless access points are configured to individually control wireless egress by processing the geo-control tags to report associated ones of the data sets that wirelessly egress the wireless communication network.

4. The wireless communication network of claim 1 wherein the user data sets comprise media files and the geo-control tags comprise watermarks embedded in the media files.

5. The wireless communication network of claim 1 wherein the wireless communication devices are configured to display geographic maps and receive at least some of the user instructions indicating geographic areas responsive to the display of the geographic maps.

6. The wireless communication network of claim 1 wherein at least some of the user instructions are to block specified ones of the data sets from wireless egress into user-identified geographic areas.

7. The wireless communication network of claim 1 wherein at least some of the user instructions are to report specified ones of the data sets that wirelessly egress into user-identified geographic areas.

8. The wireless communication network of claim 1 further comprising network gateways configured to block network egress of the user data sets based on their geo-control tags.

9. The wireless communication network of claim 1 further comprising network gateways configured to report network egress of the user data sets based on their geo-control tags.

10. A method of operating a wireless communication network, the method comprising:
in a plurality of wireless communication devices, displaying geographic control options, wherein the geographic control options comprise blocking or reporting the transmission of associated user data sets, and receiving user instructions for geographic control of the associated user data sets, translating the user instructions into geo-control tags for the associated user data sets, including the geo-control tags in the associated user data sets, and exchanging wireless signals transporting the user data sets and their geo-control tags; and
in a plurality of wireless access points, exchanging the wireless signals with the wireless communication devices that include the user data sets and their geo-control tags, and individually controlling wireless egress of the user data sets from the wireless access points based on their geo-control tags.

11. The method of claim 10 wherein controlling the wireless egress of the user data sets comprises processing the geo-control tags to block associated ones of the data sets from wireless egress of the wireless communication network.

12. The method of claim 10 wherein controlling the wireless egress of the user data sets comprises processing the geo-control tags to report associated ones of the data sets that wirelessly egress the wireless communication network.

13. The method of claim 10 wherein the user data sets comprise media files, and wherein including the geo-control tags in the associated user data sets comprise embedding watermarks in media files.

14. The method of claim 10 wherein receiving the user instructions comprises displaying geographic maps and receiving at least some of the user instructions indicating geographic areas responsive to the display of the geographic maps.

15. The method of claim 10 wherein receiving the user instructions comprises receiving the user instructions to block specified ones of the data sets from wireless egress into user-identified geographic areas.

16. The method of claim 10 wherein receiving the user instructions comprises receiving the user instructions to report specified ones of the data sets that wirelessly egress into user-identified geographic areas.

17. The method of claim 10 further comprising, in a plurality of network gateways, blocking network egress of the user data sets based on their geo-control tags.

18. The method of claim 10 further comprising, in a plurality of network gateways, reporting network egress of the user data sets based on their geo-control tags.

\* \* \* \* \*